April 26, 1966 E. A. GILBERT 3,248,645
GAUSSMETER

Filed Feb. 28, 1962 5 Sheets-Sheet 1

EVERETT A. GILBERT
INVENTOR

BY
ATTORNEY

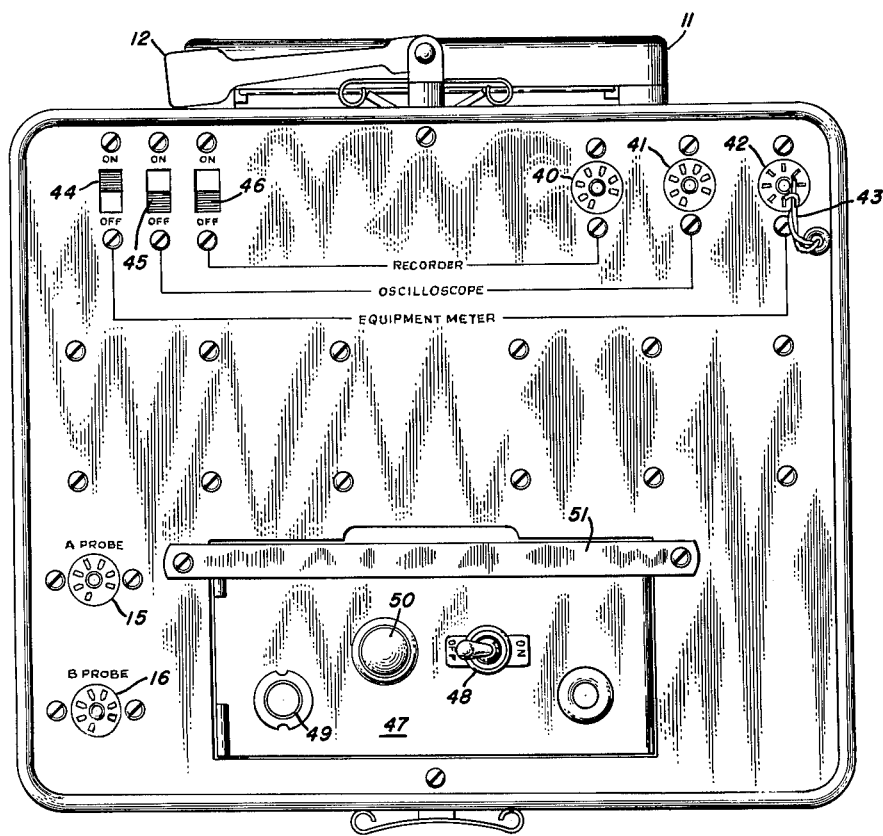

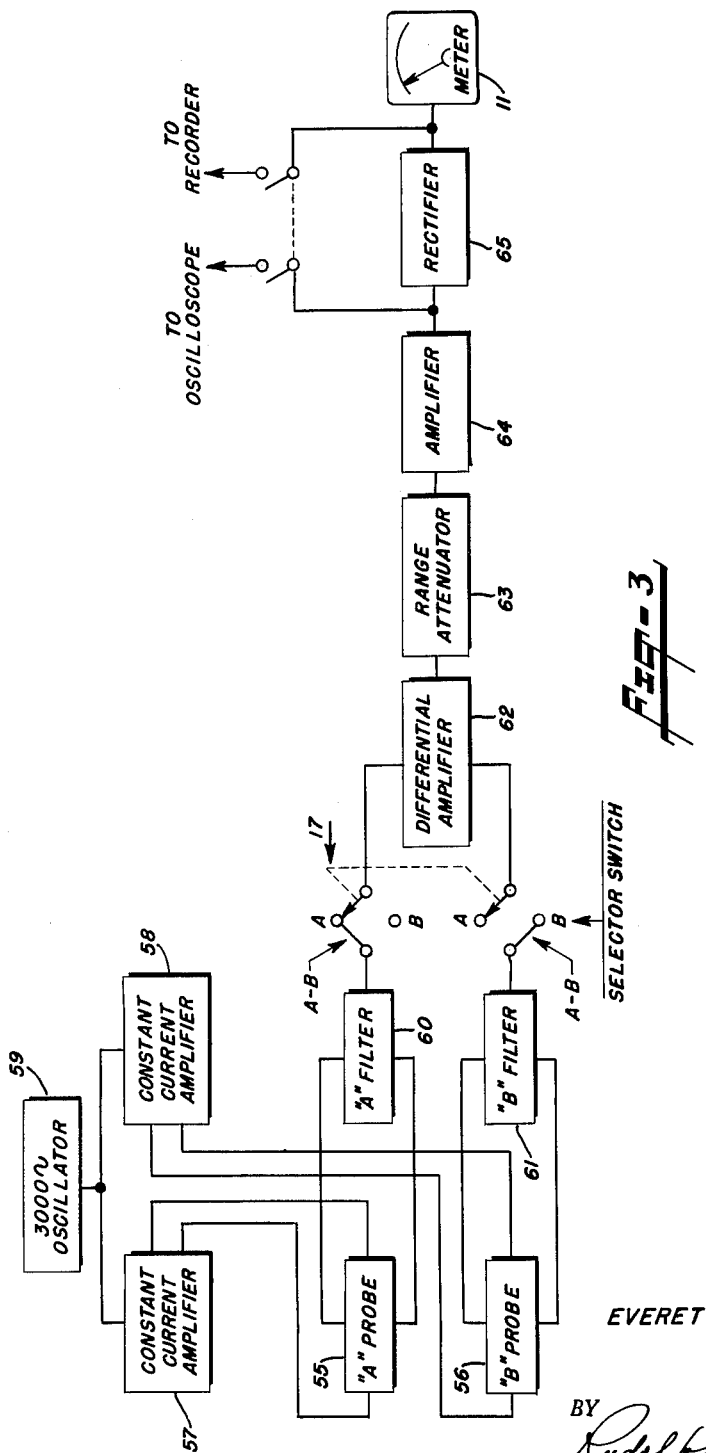

April 26, 1966  E. A. GILBERT  3,248,645
GAUSSMETER
Filed Feb. 28, 1962  5 Sheets-Sheet 4
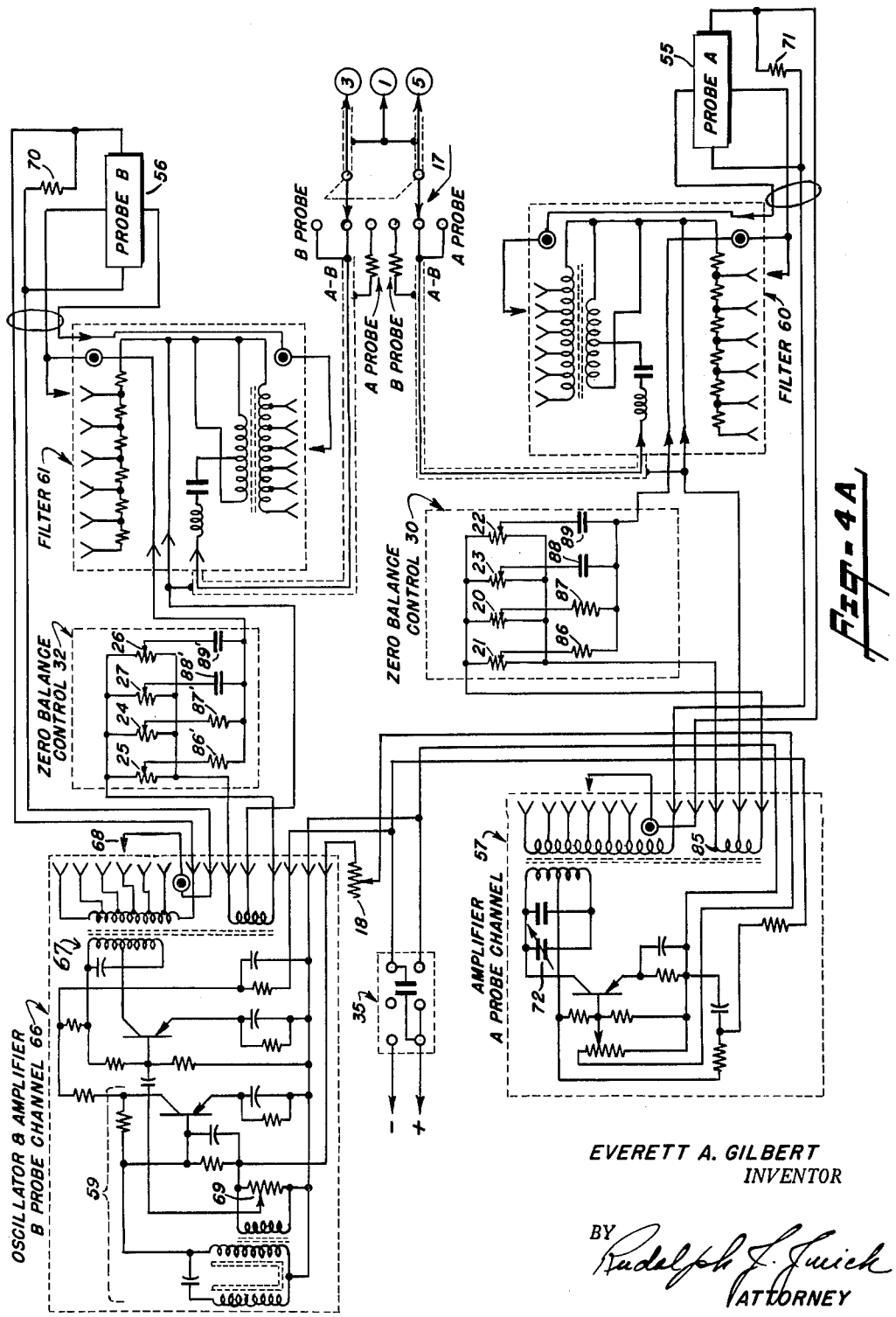
EVERETT A. GILBERT
INVENTOR
BY
/ATTORNEY

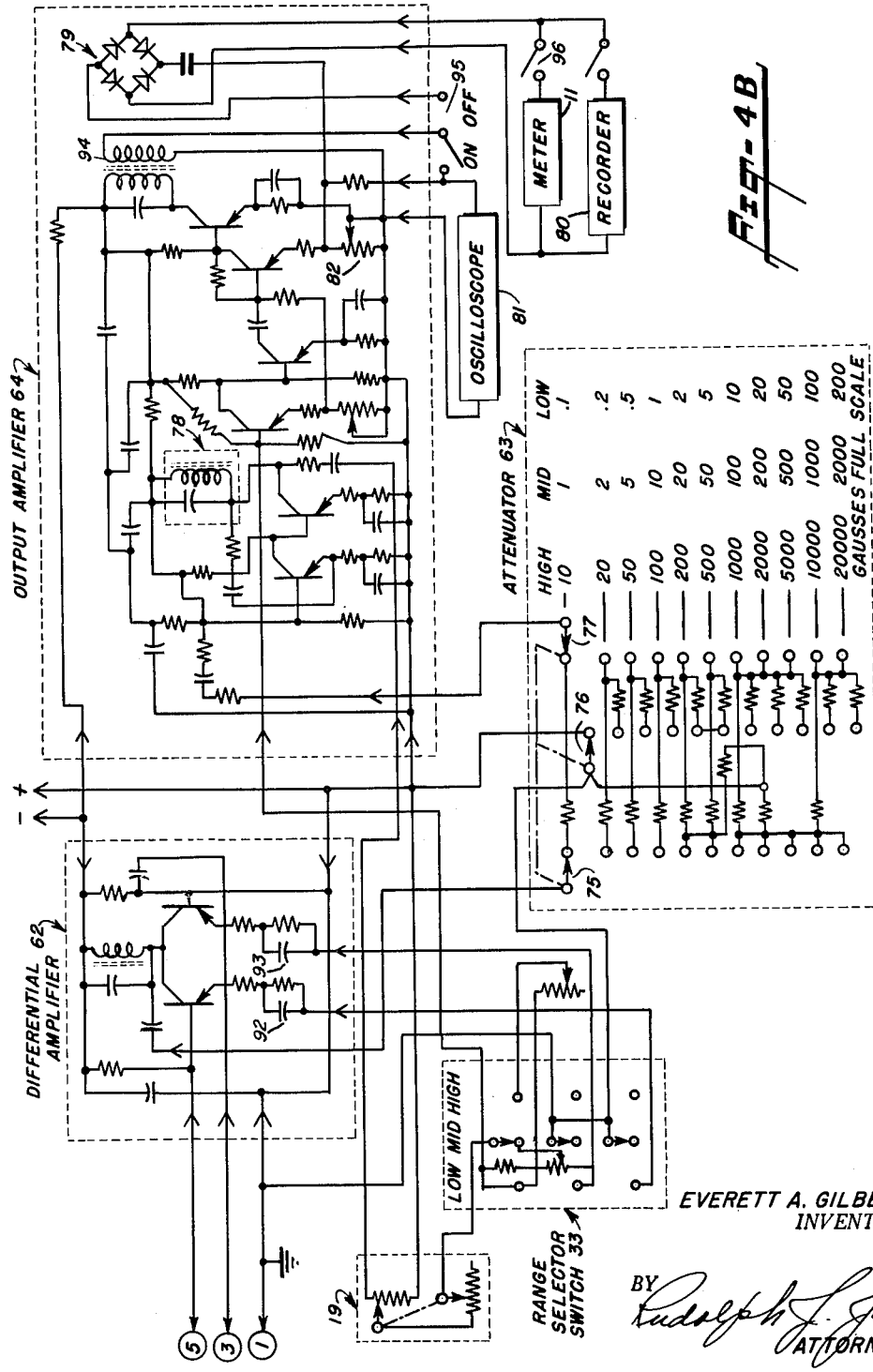

United States Patent Office 3,248,645
Patented Apr. 26, 1966

3,248,645
GAUSSMETER
Everett A. Gilbert, Denville, N.J., assignor to Radio Frequency Laboratories, Inc., Boonton, N.J., a corporation of New Jersey
Filed Feb. 28, 1962, Ser. No. 176,371
9 Claims. (Cl. 324—45)

This invention relates to a gaussmeter and more particularly to a dual probe differential gaussmeter for the measurement of either the absolute magnitude of a magnetic field or field gradients over a wide range of values.

Gaussmeters of the class to which this invention is directed utilize a sensing probe made of a material which exhibits the Hall effect. Materials exhibiting the Hall effect have a property such that an electrical potential is produced at laterally-spaced points along one axis of the material when a current is passed through an orthogonal axis thereof under the influence of a mutually perpendicular magnetic field. The output potential, or Hall voltage, is generally proportional to the product of the magnetic field intensity and the magnitude of the energizing current flowing through the body of the material. When the energizing current is of constant magnitude, the magnitude of the output potential is proportional to the intensity of the magnetic field.

A gaussmeter made in accordance with this invention is provided with two matched probes and is designed for making field gradient and absolute magnetic field measurements in the range of 0.03 to 20,000 gausses. It is a complete instrument for making direct measurements of gap flux density and analysing the location, homogeneity and intensity of residual fields. It presents both quantitative and qualitative checking of design formula predictions. The apparatus is completely transistorized, thereby providing maximum circuit stability, reducing warm up time to a minimum, and permitting battery operation for portable field use. The apparatus is housed in a relatively small case with all adjusting and operating controls located on the front panel.

An object of this invention is the provision of a gaussmeter for the direct measurement of magnetic field intensities and magnetic field gradients.

An object of this invention is the provision of a gaussmeter comprising a pair of matched probes made of a material exhibiting the Hall effect and energized by a constant alternating current, said probes producing output potentials when disposed in a magnetic field, amplifier means having an output circuit connected to a read-out means calibrated in gausses, switch means operable to apply the output potential of either or both probes to the input of the amplifier means, and means for balancing the output potentials of the probes when the probes are subjected to a magnetic field of known intensity.

An object of this invention is the provision of a multi-range gaussmeter comprising a pair of matched probes made of material exhibiting the Hall effect, means for passing a constant alternating current through the probes, amplifier means and associated circuitry responsive to the output voltage developed by the probes, read-out means responsive to the amplifier output and calibrated in gausses, range-changing means manually operable to a selected one of several positions, a dial mechanically coupled to the range-changing means and carrying a plurality of sets of circumferentially spaced range markings, each of such markings being laterally spaced from each other, means exposing to view only that set of range markings which corresponds to the selected position of the range-changing switch, rotary means alignable with the one of range markings exposed to view, and circuit elements effective upon operation of the range-changing means and the rotary means to condition the circuitry for the measurement of the field strength in the selected range.

An object of this invention is the provision of a differential gaussmeter comprising two matched probes made of material exhibiting the Hall effect, a differential amplifier responsive to the output voltage of both probes connected in opposition, filter means in the output circuit of each probe, read-out means calibrated in gausses, and range attenuator means between the output of the amplifier and the read-out means to adjust the voltage applied to the read-out means to a selected one of several maximum values.

These and other objects and advantags will become apparent from the following description when taken with the accompanying drawings. It will be understood, however, that the drawings are for purposes of illustration and are not to be construed as defining the scope or limits of the invention, reference being had for this purpose to the claims appended hereto.

In the drawings wherein like reference characters denote like parts in the several views:

FIGURE 2 is a view showing the back of the gaussmeter and with the measuring instrument in the horizontal position;

FIGURE 3 is a block diagram of the apparatus; and

Figure 1:
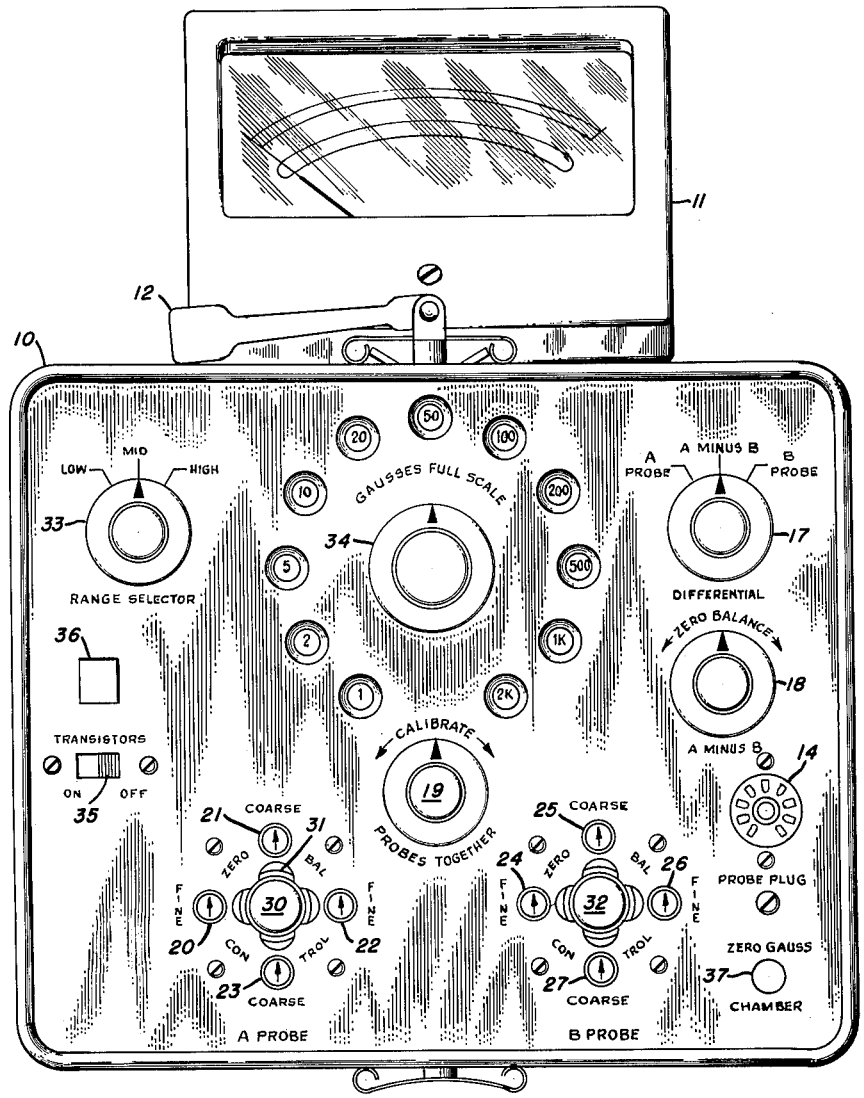
FIGURE 1 is a view taken from the front of a gaussmeter made in accordance with this invention and showing the measuring instrument in a tilted position.

FIGURES 4A and 4B comprise a schematic circuit diagram of the apparatus.

Reference, now, is made to FIGURE 1. The apparatus is contained within a case 10 having a front panel which carries the adjusting and operating controls. The measuring instrument 11, having a plurality of scales calibrated in gausses, is removably mounted on the top of the case in such manner that it can be tilted to one of several positions to facilitate the reading thereof. Preferably, the instrument is of the shielded, core magnet type provided with a mirror scale and a knife-edge pointer whereby the instrument magnet exerts no stray fields to affect measurements made close to it and the pointer indication can be read with a high degree of accuracy. A pivotally-mounted handle 12 spans the instrument, as shown.

The two sensing probes, of similar construction, are provided with leads terminating in a common connection plug insertable into the socket 14, shown in FIGURE 1. Alternatively, each probe may have a separate plug for connection to the individual sockets 15 and 16, located at the rear of the case as shown in FIGURE 2. One or the other, or both, probes are connectable into the circuit of the apparatus by means of a three position function switch 17. Calibration and balancing of the probes to maintain the accuracy of indication of the instrument 11 is effected by adjustment of the rheostats identified by the numerals 18 and 19 and the potentiometers identified by the numerals 20–27, inclusive. The specific function of these adjustable components will be described hereinbelow with specific reference to FIGURES 4A and 4B. It is here pointed out that the adjustable resistors 20–23 provide the zero balancing functions for the probe A whereas the adjustable resistors marked 24–27 serve similar functions for the probe B. Adjustment of the individual resistors 20–23 is effected by means of the knob 30 and a friction disc 31 which are carried by a spring-biased shaft. The knob and shaft normally are spring-held in the illustrated neutral position. However, the knob 30 can be moved to the left, right, up or down to bring the friction disc into engagement with the shaft of a selected one of the adjustable resistors 20–24 whereupon rotation of the knob produces a corresponding rotation of the engaged shaft. The knob 32 and an associated friction disc are similarly arranged to effect adjustment of a selected one of the resistors 24–27. This arrangement results in the automatic disengagement of the driving means from the adjusting resistors upon release of the knob, whereby the accidental disturbance of the balanced condition is unlikely after the adjustment is made.

The apparatus is provided with three sets of eleven overlapping ranges, a particular set of ranges being selectable by positioning of the Range Selector switch 33. This switch is coupled mechanically to a dial plate which is slidable along the rear surface of the front panel and which has imprinted thereon three sets of eleven measuring range markings circumferentially spaced in registry with apertures formed in the front panel. As shown in FIGURE 1, the Range Selector switch 33 is set to the mid-range position wherein the dial markings 1, 2—1K, 2K are visible through the apertures. Any one of these eleven measuring ranges can be selected upon rotation of the knob of the switch 34. In the illustrated position of the switch 34, the electrical circuit is conditioned for a measuring range of 0–50 gausses which range corresponds to full scale deflection of the instrument 11. Rotation of the switch 34 to the next index position alters the circuit to provide a measuring range of 0–100 gausses. Movement of the Range Selector switch 33 to the low-range position brings into view, through the panel apertures, a new set of 11 measuring ranges covering a span of 0–0.1 to 0–200 gausses. Similarly, movement of the Range Selector switch to the high-range brings into view 11 measuring ranges covering a span of 0–10 to 0–20,000 gausses. With this arrangement, the apparatus, with 100 calibrated divisions on the scale of the instrument 11 provides a direct measurement of magnetic field intensities of 0.3 to 20,000 gausses.

The front panel of the gaussmeter also carries a switch 35 for completing the circuit between the power supply and the transistors, such switch including an indicator flag visible through the rectangular panel aperture 36 when the circuit is energized. When making zero balance adjustments, the two probes should be free of any magnetic field influence. Such zero gauss condition obtains in a cylindrical chamber made of Mu-metal, properly shielded and accessible through the front panel opening 37, said opening being of a size to accommodate the dual probes of the apparatus. A zero balance condition of each individual probe, or of both probes, having their output potentials connected in opposition, is indicated by alignment of the pointer of the instrument 11 with the zero scale mark.

It is also necessary to balance and check the circuit for the full deflection range of the indicating instrument in order to assure an accurate and direct indication of gausses. Such adjustments are made with one, or both probes positioned in an air gap having a fixed, known magnetic flux density. Standard magnets are available for this purpose. Such magnets are accurately calibrated, are stabilized against magnetic changes and are provided in various flux density values such as, for example, 100 gauss, 200 gauss, 10,000 gauss.

Reference, now, is made to FIGURE 2. Here are shown the separate sockets 15 and 16 for receiving the individual plugs of the two probes and sockets 40 and 41 for receiving the connection plugs of a recorder and oscilloscope, respectively. The measuring instrument 11, here shown in the horizontal position, is connected into the circuit by means of the plug 42 and lead wires 43. The mutually exclusive connection into the electrical circuit of one of the read-out devices (measuring instrument 11, recorder or oscilloscope) is controlled by three, ganged switches 44, 45, 46, operation of any one of the switches to the "on" position resulting automatically in a movement of one of the other two switches to the "off" positions.

FIGURE 2 shows a 110 volt, A.C. power pack 47 plug-connected to the apparatus. The power pack is a plug-in unit carrying the transformer, rectifiers, etc., and includes a line switch 48, a fuse 49, a pilot lamp 50 and a three conductor cable (including a ground wire) for connection to a source of A.C. power. Upon removal of the metal holding strap 51, the power pack can be replaced by a similar plug-in unit carrying batteries, thereby making the gaussmeter self-contained for remote field use.

The block diagram of FIGURE 3 illustrates the electrical arrangement of the gaussmeter. The two probes 55 and 56, each being a Hall sensing element, are individually energized by the associated contant current amplifiers 57, 58 which, in turn, are driven by a 3000 cycle oscillator 59. These probes are identical and contain indium arsenide elements that have been matched to a common standard. The output voltage of each probe is passed through the harmonic phase-reversed filters 60, 61, and then applied to the differential amplifier 62 through the selector switch 17 (see, also, FIGURE 1). When the switch 17 is in the center (A–B) position, the differential amplifier takes the inverted output of the B probe and adds it to the A probe performing the subtraction required for the A–B position of the switch. The output of the differential amplifier is applied to a precision range attenuator 63 that is impedance matched to both the differential amplifier 62 and the output amplifier 64 so that once the electrical system is calibrated on one full scale measuring range, the other measuring ranges also fall on calibration. The output of the amplifier 64 is applied directly to an oscilloscope, or through a linear rectifier 65 to either a recorder or the measuring instrument 11. Three, fixed, amplifier gain positions, with a vernier control to calibrate the system, are provided to cover the three sets of ranges of the apparatus.

After balancing both probes when placed in the zero gauss chamber, the probes are placed into a 100 gauss standard magnet and the amplifier gain adjusted to provide a top mark reading on the scale of the measuring instrument, first for the A probe and then for the B probe. The instrument is then in calibration for the measurement of field intensity with either probe on any selected one of the various measuring ranges. For measuring field gradients, the two probes are held in parallel planes spaced a known distance apart, in which position the probes are unaffected by the earth's magnetic field. A convenient housing for holding the two probes in spaced, parallel position is shown in United States Patent No. 3,125,719, issued March 17, 1964 and entitled, "Gaussmeter Probes and Housing Structure For Supporting the Probes in Different Operative Arrangement." When both probes are connected to the differential amplifier, the measuring instrument provides a direct reading of the difference in the field intensity between the two planes in which the probes are positioned, or field gradient. The most sensitive range of the gaussmeter is 0.1 gauss full scale and the maximum range for field difference measurements is 10,000 gauss. Therefore, a field gradient of 0.1 gauss per 0.1 inch would result in a full scale instrument indication on the most sensitive range.

Reference will now be made to the schematic circuit diagram of FIGURES 4A and 4B. It may here be pointed out that major components of the circuit are plug-in units thereby facilitating the assembly of the gaussmeter and the replacement of a particular component.

Referring, specifically, to FIGURE 4A, the apparatus is energized by closure of the line switch 35 (see also FIGURE 1) to the left, such switch being connected to a source of D.C. voltage, of proper level, by the leads marked (+) and (−). The 3,000 cycle oscillator 59 and the amplifier for the B probe channel are here combined in a single plug-in unit identified by the reference numeral 66. The amplifier output transformer 67 is provided with a multitap secondary coil to permit matching to probes of different resistances by means of the pin connector 68. In actual practice, the pin 68 usually is connected to the 5 ohm tap of the secondary winding. The voltage output of the oscillator is adjusted by means of the oscillator gain control resistor 69 to provide an output or drive voltage of 0.1 volt across a 2 ohm resistor 70 connected across the input leads of the B probe 56. A similar resistor 71 is connected across the A probe 55. The nominal resistance of the indium arsenide probe is 2 ohms between the current leads and 1 ohm between the output leads, whereby the 3,000 cycle current flowing through the probes is approximately .050 ampere.

The amplifier 57 is identical to the amplifier portion of the unit 66 and is used to supply power to the A probe 55, said amplifier 57 also being driven by the oscillator 59. A trimmer capacitor 72, in the collector tank circuit of the amplifier 57, is used to adjust the phase of the A probe output voltage to be exactly in phase with that of the B probe, such adjustment being effected in the initial adjustment of the apparatus with the function switch 17 (see also FIGURE 1) set in the A minus B position. The trimmer capacitor is accessible upon opening the case of the gaussmeter, since its value, when once set, remains fixed for a particular set of probes.

The output potentials developed by the sensing probes are applied to the respective harmonic filters 60, 61 which are interposed between the probes and the function switch 17. The zero balance control 30 is interposed between the filter 60 and a center-tapped secondary coil 85 on the output transformer of the associated amplifier 57. This zero balance control circuit comprises the potentiometers 20–23 (see also FIGURE 1,) the fixed resistors 86 and 87, and the capacitors 88 and 89. The values of the potentiometers 20 and 21 and the fixed resistors 86 and 87 are so chosen that the potentiometers 21 and 20 provide coarse and fine adjustments, respectively, of the in-phase voltage component applied to the probe. The values of the potentiometers 22 and 23 and the capacitors 88 and 89, are so chosen that the potentiometers 23 and 22 provide coarse and fine adjustments, respectively, of the quadrature voltage component applied to the probe. With reference to the similar zero balance control 32, the potentiometers 25 and 24 provide coarse and fine adjustments of the in-phase voltage component applied to the probe B and the potentiometers 27 and 26 provide coarse and fine adjustments of the quadrature voltage component applied to this probe. Thus, the two zero balance controls 30 and 32 serve to adjust the phase and magnitude of small voltages injected into the probes for the purpose of balancing out the residual resistive unbalance in each probe. This operation is performed when the two probes are placed in the zero gauss chamber 37 (see FIGURE 1). The purpose of the filters 60 and 61 is to remove harmonic voltages from the signal as generated by the oscillator 59, each filter having a 1000 cycle band width. Each of the filters 60 and 61 is provided with a plurality of push-pin taps for probe impedance matching within a range, say of 2 to 50 ohms. With the two probes placed in a 100 gauss reference magnetic field, the output voltages are made equal by adjusting the gain of the current amplifier 57 by means of the zero balance resistor 18 (see also FIGURE 1). Now, when the probes are placed in an unknown magnetic field, each probe will develop an output potential having a frequency of 3,000 cycles and a magnitude proportional to the magnetic field intensity. These potentials appear across the function switch 17 and are applied to the differential amplifier through the leads marked ①, ③ and ⑤ in correspondence with the setting of the switch 17. Specifically, when the switch is rotated to either the A probe or B probe positions, only the probe so selected is connected to the differential amplifier, whereas both probes are connected to the differential amplifier when the switch is set to the center A–B position.

Reference now is made to FIGURE 4B which shows the range selector switch 33, the differential amplifier 62, the voltage attenuator 63 and the output amplifier 64. It will be understood that the leads marked ①, ③, and ⑤ are continuations of the similarly marked leads in FIGURE 4A.

The differential amplifier 62 consists of two transistor amplifiers with a common collector load and is designed to provide a gain of about 10. When both probes are connected thereto, the differential amplifier produces an output voltage equal to the difference between the output potentials of the individual probes. Such output voltage, however, is adjusted in magnitude by means of the calibrating resistor 19 which comprises a potentiometer and variable resistor having ganged adjustable arms, as shown.

The output of the differential amplifier is applied to the output amplifier 64 through the precision attenuator 63, the latter being impedance matched to both amplifiers so that once the circuit is calibrated on one full scale range, the other ranges fall on calibration. Three fixed amplifier gain positions are provided by the range selector switch 33 to cover the three ranges of the apparatus. The lower two sets of contacts, on the range selector switch 33, serve to switch the capacitors 92 and 93, of the differential amplifier 62, from the emitters to ground, thereby to increase the gain of this amplifier by a factor of 10 when the switch is set to the LOW position. The upper set of contacts, on the switch 33, serves to insert resistance into the output amplifier 64, thereby to change the amplifier gain in correspondence with the setting of the switch. Thus, when the switch 33 is set to the MID position, a rotation of the knob 34 (see FIGURE 1) results in a movement of the three ganged arms 75, 76 and 77 of the attenuator into successive engagements with the associated stationary contacts thereby fractionating the voltage applied to the output amplifier 64 in ratios corresponding to the gauss markings appearing under the heading MID and which are visible through the circular apertures formed in the front panel of the apparatus (see FIGURE 1). Rotation of the selector switch 33 to either the LOW or HIGH position alters the circuit connections so that the fractionation of the voltage applied to the output amplifier 64 corresponds with the gauss markings appearing under the corresponding heading LOW or HIGH. For purposes of description, each set of the 10 range markings appear in tabular form under the headings HIGH, MID and LOW, in association with the attenuator 63, in FIGURE 4B. It will be apparent, however, that each such set of range markings is carried in spaced, circumferential form on the dial slidably disposed behind the front panel of the apparatus, as shown for the MID position in FIGURE 1 wherein these particular range marking are visible through appropriate apertures formed in said panel. Also, as has been stated hereinabove, the dial carrying the 3 sets of range markings is mechanically coupled to the range selector switch 33 so that at any given time only that set of range markings is visible which corresponds to the setting of the switch 33.

The output amplifier 64 consists of three pairs of transistors and a feedback loop comprising the output winding 94 and the resistor 82. A band-pass filter 78 is included in the first pair of transistors to pass the band of frequencies between 2,000 and 4,000 and reject noise voltages outside of the useful band. When the switch 95 is closed to the right, and assuming the switch 96 is closed, the bridge rectifier 79 and the meter 11 are connected into the feedback loop, thereby to reduce the non-linear effect of the bridge rectifier and provide a linear meter scale. Although shown schematically in FIGURE 4B, the meter 11, or a recorder 80, or an oscilloscope 81 can be connected into the circuit in a mutually exclusive manner. This is accomplished by the switches 44, 45 and 46 shown in FIGURE 2, such switches being ganged in such manner that operation of one switch to the ON position automatically throws one of the other two switches to the OFF position. In the case of the meter and the recorder, either of these units are energized by the D.C. output voltage of the rectifier 79. In the case of the oscilloscope, the recorder and the meter are switched out of the circuit and a resistor 82 is substituted for an output load, the oscilloscope output being taken across this resistor to display the carrier and its envelope. Such output may be termed a double side band with suppressed carrier.

The design and construction of the individual plug-in units of the circuit follow conventional practice, and it is believed the above description thereof is sufficient for a proper understanding of the invention. The essence of the invention lies in the overall circuit combination providing a gaussmeter useful either for the measurement of magnetic field intensity utilizing one probe, or for the measurement of field gradient utilizing both probes, together with convenient means facilitating the calibration and adjustment of the apparatus for precise measurements. The following description of the theory of operation and the checking procedures just prior to actual use of the apparatus will promote a thorough understanding of the invention and its practical features.

Theory of operation

The Hall effect occurs when a thin strip of metal or a semiconductor is placed in a magnetic field with current flowing from end to end of the strip and the magnetic field perpendicular to the strip. The magnetic field tends to cause electrons in the strip to travel in cured paths charging up the sides of the conductor until a transverse electric field exists of the proper magnitude to cancel the effect of the magnetic field and causes the electrons to travel through the solid undeviated. In magnitude, the ouput potential developed by the Hall element, forming the sensing probe, is proportional to the magnitude of the current caused to flow therethrough and the magnetic field intensity. By maintaining a known, constant, flow of energizing current and relating the developed output potential of a particular Hall element to magnetic field strength, the gaussmeter provides a direct reading of field strength in gausses.

Each Hall element is mounted in its own separate probe and is driven by a constant current amplifier, both such amplifiers being driven by a 3,000 cycle oscillator. The phase of the Hall voltage outputs of the two probes is adjusted to be exactly in phase by varying the tuning of the constant current amplifier and the relative sensitivity of the probes is controlled by adjustment of the gain of one of the amplifiers by means of the zero balance control 18 (see FIGURES 1 and 4B). The Hall output voltage of each probe is set to zero by placing the probe into a zero magnetic field (zero gauss chamber 37, FIGURE 1) and inserting small voltages of the correct magnitude and phase in series with each of the Hall elements. These voltages are controlled by the individual zero balance controls identified by the numerals 30, 32 in FIGURE 4A and, for ease of reference, by the similarly identified knobs 30, 32 in FIGURE 1, it being pointed out that the knobs 30, 32, in FIGURE 1, merely serve to adjust the associated resistors 20–23 and 24–27, respectively.

The probes are then placed into the flux gap of a standard magnet (having a field density of, say, 100 gauss) and the output voltages are made equal by adjusting the gain of one of the constant current amplifiers by means of the A minus B zero balance control identified by the numeral 18 in FIGURE 1 and the variable resistor 18 in FIGURE 4A. With the range attenuator 63 set to the 100 gauss position, the gain of the output amplifier 64 is adjusted so that the pointer of the meter 11 is aligned with the top scale mark, namely, 100 gauss. The 100 gauss reference is preferred for this particular adjustment step as this range is common to all three groups of ranges. When the zero and top mark adjustments have been made either probe can then be used to measure the magnitude of field.

For the measurement of magnetic field gradients, the phase of one of the probes is reversed and both probes are switched into the differential amplifier circuit by setting the function switch 17 to the A minus B portion. The difference in the field intensity betwen the two points where the A and B probes are placed is then indicated by the meter. The ultimate accuracy of the apparatus is dependent upon the accuracy of the reference, or standard, magnet and the accuracy of the precision attenuator. Both of these can be readily held to a tolerance factor not exceeding ±1 percent. After the apparatus has been calibrated on one attenuator position, it will remain in calibration for all other positions provided the amplifier gain controls are not changed. The range selector switch 33 and the calibrator potentiometer 19 control the amplifier gain whereas the precision attenuator is controlled by the gausses full scale switch 34.

Adjusting and checking procedures

Preliminary adjustments of the apparatus are performed as follows. The A probe is placed into a 100 gauss reference magnet and connected to the apparatus through the plug-jack connectors. With the range selector switch 33 set to the MID position, and the gausses full scale switch 34 set to align with the marking 100 visible through the panel aperture, the calibrate control 19 is adjusted to bring the pointer of the meter 11 into alignment with the top mark on the scale. The probe then is placed into the zero gauss chamber 37 and the zero balance control 30 adjusted to bring the meter pointer indication to the zero scale mark. All four zero balancing functions are controlled by the one, 4-way knob 30 which disengages upon release so that accidental disturbances of the balanced condition is unlikely after the adjustments are made. Initially, all of the shaft arrows of the potentiometers 20, 21, 22 and 23 are set in vertical positions. The knob 30 is first moved downwardly to effect an adjustment of the lower course potentiometer 23 and thereby adjust the meter for a null. Next, the knob 30 is moved upwardly to engage the upper, course potentiometer 21 and adjustment made to get a lower meter null. The sensitivity of the apparatus now is increased to 10 gausses full scale by rotation of the knob 34 into alignment with the visible 10 mark and the course potentiometers are alternately adjusted until the null point is below the 1 gauss graduation on the meter scale. The knob 34 is then rotated to bring the reference mark into alignment with the 0.1 visible marking and the zeroing operation completed by similar adjustment of the fine potentiometers 20 and 22. The final zero will fall below the .02 gauss scale reading, such zero representing thermal noise in the Hall element and the base electrode of the first transistor, but these factors do not enter into the accuracy of measurements for meter indications which lie beyond approximately the first quarter of the scale length. In general, the higher scale ranges of the meter are used for measurements above 10 gausses and the lower for measurements below 1.0 gauss.

The apparatus is adjusted in the same way for the B probe.

Once the above preliminary adjustments are made, they need not be repeated except perhaps after a relatively long interval of time. However, just prior to the actual use of the apparatus, it is advisable to perform a checking operation to assure precision of measurement.

To check the apparatus for absolute magnetic field measurements, either probe, say, the A probe, is placed into the zero gauss chamber. With the function switch 17 set to the A probe position, the reading on the meter is observed. Alignment of the meter pointer with the zero scale mark is effected simply by appropriate adjustment of the zero balance control 18. The range selector switch 33 and the gausses full scale switch 34 are then set to the desired position for the particular measurement to be made. For example, if measurements are to be made in the range of 0–100 gausses, the switch 33 is set to the LOW position and the switch 34 to the 100 mark visible through the panel aperture. The probe is then placed into a 100 gauss standard magnet whereupon the meter pointer should be aligned with the top scale mark. If such is not the case, suitable adjustment is made by means of the calibrate control 19. The probe can then be placed into the field to be measured and the meter will provide a direct indication of the field intensity within an accuracy of ±3 percent. If greater accuracy is required, reference is made to suitable probe calibration data. An ultimate accuracy of ±1% is obtainable.

To check the apparatus for use in making field gradient measurements, both probes are placed into the zero gauss chamber and the zero balance control 18 is set to the MID point of its rotation. The function switch 17 is set to the A probe position and the meter reading checked on the 0.1 range. If necessary, adjustment of the A probe zero balance control 30 will effect a zero meter indication. The function switch is then rotated to the B probe position and a similar zero indication of the meter effected by adjustment of the related B probe zero balance control 32. The switch 17 is then switched to the A minus B position whereby the combined zero reading will now be less than .03 gauss. Both probes are then inserted into a 100 gauss reference magnet and the range selector switch 33 and the gausses full scale switch are set for a 100 gauss range, whereupon the meter should provide a top mark indication. If not, the function switch 17 is returned to the A probe position and the calibrate control 19 adjusted accordingly. Then the switch is moved to the B probe position and the top mark adjustment effected by means of the A minus B zero control 18. With the switch 17 returned to the A minus B position, and the full scale switch 34 set to the 5 gausses range mark, the control 18 is finally adjusted for a minimum meter indication (which indication will be less than 1 gauss) whereupon the device is ready for the use in the direct measurement of magnetic field gradient.

Having now described my invention, those skilled in this art will have no difficulty in making minor changes and modifications to adapt the apparatus for specific uses. It is intended that such changes and modifications shall fall within the scope and spirit of the invention as set forth in the following claims.

I claim:
1. A gaussmeter comprising,
 (a) first and second sensing probes carrying Hall elements, each probe having an input current circuit and an output voltage circuit,
 (b) a fixed frequency oscillator,
 (c) a pair of constant current amplifiers driven by the oscillator and having individual output circuits connected to the associated probe input circuit,
 (d) individual harmonic filters in the output circuits of the probes,
 (e) a differential amplifier having a pair of input circuits and an output circuit,
 (f) a manually-operable switch connected between the said filters and the input circuits of the differential amplifiers, said switch being settable to a selected one of three positions, thereby to apply the output voltage of either or both probes to the differential amplifier input circuits,
 (g) an output amplifier,
 (h) a voltage attenuator network connected between the output of the differential amplifier and the input of the output amplifier, and
 (i) read-out means calibrated in gausses and energized by the output of said output amplifier.
2. The invention as recited in claim 1, including means to adjust the output voltage of each probe when the probes are subjected to a magnetic field of known intensity.
3. The invention as recited in claim 1, wherein the voltage attenuator network comprises three sets of stationary contacts, three movable contacts simultaneously positionable into engagement with selected ones of said sets of stationary contacts, three sets of range markings associated with said sets of stationary contacts, and electrical resistor elements connected between certain of said sets of stationary contacts, the ohmic values of said resistors being such that with a known voltage applied to the attenuator the deflection range of said read-out means corresponds to the range marking associated with the position to which the said movable contacts are set.
4. The invention as recited in claim 3, including a range selector switch settable to a selected one of three positions corresponding to the three sets of ranges of the attenuator network, and circuit elements connecting the range selector switch between the differential amplifier output circuit and selected movable contacts of the voltage attenuator network whereby the magnitude of the voltage applied to the attenuator is such as to maintain the calibration of the read-out means for that set of attenuator network ranges corresponding to the setting of said range selector switch.
5. A gaussmeter comprising:
 (a) a housing having a front panel, said housing carrying an electronic circuit comprising a fixed frequency oscillator, first and second constant current amplifiers, first and second harmonic filters, a differential amplifier and output amplifier,
 (b) circuit elements for applying the oscillator output to both said constant current amplifiers,
 (c) first and second Hall element sensing probes,
 (d) plug-socket means for connecting the input circuit of the first probe to the output circuit of the first constant current amplifier and the output circuit of the probe to the first filter,
 (e) plug-socket means for connecting the input circuit of the second probe to the output circuit of the second constant current amplifier and the output circuit of the probe to the second filter,
 (f) means carried by the housing panel for adjusting the current flow through the input circuit of each probe,
 (g) a probe-selector switch carried by the housing panel and settable to a selected one of three positions,
 (h) circuit elements connecting the said probe switch into the electronic circuit such that the output voltages of either one or obth probes are applied to the differential amplifier,
 (i) multi-range read-out means calibrated in gausses and energized by the said output amplifier,
 (j) a voltage attenuator carried by the said panel and comprising three movable contacts simultaneously rotatable into engagement with selected ones of three sets of spaced stationary contacts, and calibrated resistors connected across certain of the stationary contacts,
 (k) a dial disposed behind the said panel and carrying three distinct sets of range markings, each set of range markings being associated with a set of stationary contacts of the voltage attenuator,
 (l) means forming spaced apertures in the said panel through which only one set of said range markings is visible at a given time,
 (m) a range selector switch carried by the panel and settable to a selected one of three positions corresponding to the three sets of range markings carried by said dial,
 (n) means effective upon setting of the range-selector switch to displace the said dial thereby to expose to view through the said apertures the corresponding set of range markings,
 (o) circuit elements connecting the range-selector switch between the differential amplifier and certain of the movable contacts of the said voltage attenuator, and

(p) circuit elements connecting certain of the movable contacts of the voltage attenuator to the output amplifier, the arrangement being such a setting of the range-selector switch to a selected position applies to the voltage attentuator a voltage of proper magnitude such that the calibrated range of the read-out means corresponds to the setting of the voltage attenuator movable contacts as indicated by the associated range markings.

6. The invention as recited in claim 5, including, (r) first and second zero balancing potentiometers carried by the said panel, and circuit elements connecting each said zero balancing means between the associated constant current amplifier and filter thereby to adjust the deflection of the read-out means to a predetermined value when the probes are subjected to a magnetic field of predetermined intensity.

7. The invention as recited in claim 6 in combination with a zero gauss chamber disposed within the said housing and aligned with an opening formed in the housing panel, said opening being of a size to receive both probes.

8. The invention as recited in claim 5, wherein the output circuit of the output amplifier comprises a rectifier bridge having output diagonals connected to the said read-out means.

9. The invention as recited in claim 8, in combination with a load resistor having a value equal to that of the rectifier bridge and the read-out means, and switch means operable to substitute the said load resistor for the rectifier bridge and read-out means in the output circuit of the output amplifier.

References Cited by the Examiner
UNITED STATES PATENTS

| | | | |
|---|---|---|---|
| 2,288,310 | 6/1942 | Zuschlag | 324—140 |
| 2,306,456 | 12/1942 | Mayne | 324—140 |
| 2,562,120 | 7/1951 | Pearson | 324—45 |
| 2,886,779 | 5/1959 | Kubrt et al. | 324—45 |

RICHARD B. WILKINSON, *Primary Examiner.*

WALTER L. CARLSON, *Examiner.*